United States Patent [19]

Bator et al.

[11] Patent Number: 4,802,541
[45] Date of Patent: Feb. 7, 1989

[54] WEIGHING SCALE WITH VOICE COIL

[75] Inventors: Feliks Bator; Kevin D. Hunter, both of Stratford; Robert T. Durst, Jr., Monroe, all of Conn.

[73] Assignee: Pitney Bowes Inc., Stamford, Conn.

[21] Appl. No.: 166,859

[22] Filed: Mar. 11, 1988

[51] Int. Cl.⁴ .................... G01G 7/00; G01G 23/06
[52] U.S. Cl. ..................................... 177/212; 177/189
[58] Field of Search ............................ 177/189, 212

[56] References Cited

U.S. PATENT DOCUMENTS

| | | | |
|---|---|---|---|
| 4,034,819 | 7/1977 | Akers et al. | 177/212 X |
| 4,420,055 | 12/1983 | Grutzediek et al. | 177/212 |
| 4,553,618 | 11/1985 | Kusmenskji et al. | 177/212 X |

Primary Examiner—George H. Miller, Jr.
Attorney, Agent, or Firm—Peter Vrahotes; Melvin J. Scolnick; David E. Pitchenik

[57] ABSTRACT

A weighing scale capable of weighing articles in a rapid and accurate fashion. The tray of the scale is supported by at least one spring and becomes vertically displaced in proportion to the weight of an article placed thereon. A voice coil is used to bias the tray to its original position, and the weight of the article is determined by measuring the current in the voice coil.

9 Claims, 8 Drawing Sheets

WEIGHT CALCULATOR 52

FIG. 5
ZEROING CIRCUIT 60

FIG. 8
ADAPTION CONTROLLER 40

WEIGHING SCALE WITH VOICE COIL

BACKGROUND OF THE INVENTION

Field of the Invention

There are certain processes in which the weighing of an article in a rapid fashion is required and efforts have been made to satisfy this requirement. In a co-pending application, assigned to the assignee of the instant application, entitled Apparatus and Method of Determining the Mass of an Article by Measuring the Shift in the Period of Harmonic Motion, Ser. No. 073,790, and filed July 13, 1987, this problem is addressed. The scale described in said copending application has proven to be a most satisfactory scale for rapidly weighing flat articles. As the title of said co-pending patent application indicates, the principle of the invention resides in measuring the vibration of a horizontally oscillating tray and determining the weight of an article on the tray from the frequency of oscillation.

Another type of scale that produces highly accurate weighing results is a force balance transducer, sometimes referred to as a magnetic scale. In this type of scale, a tray is displaced vertically as a result of the weight of an article placed thereon and a magnetic field returns the tray to its original position. Although accuracy is obtained with such a scale, the primary drawback has been the length of time required to attain the weight. With present magnetic scales, the damping period for the scale to achieve equilibrium is extensive. Clearly, it would be advantageous to have a magnetic scale not only capable of giving accurate weight, but also capable of rapid weighing.

SUMMARY OF THE INVENTION

A force balance transducer type of scale has been conceived whereby a tray is supported by at least one spring whereby the tray is vertically displaced in proportion to the weight of an article placed upon the tray. A voice coil actuator is arranged so as to induce a force upon the tray in such a way as to counter the movement due to the weight. A control system senses the change in position of the tray as a result of the article and applies sufficient current to the voice coil actuator to return the tray to its original position. The current supplied to the voice coil actuator is controlled so as to rapidly damp the tray. When the tray is stabilized at the original or rest position, the weight of the article can be calculated from the current applied to the voice coil actuator.

DETAILED DESCRIPTION OF THE PREFERRED EMBODIMENTS

Figure 1:
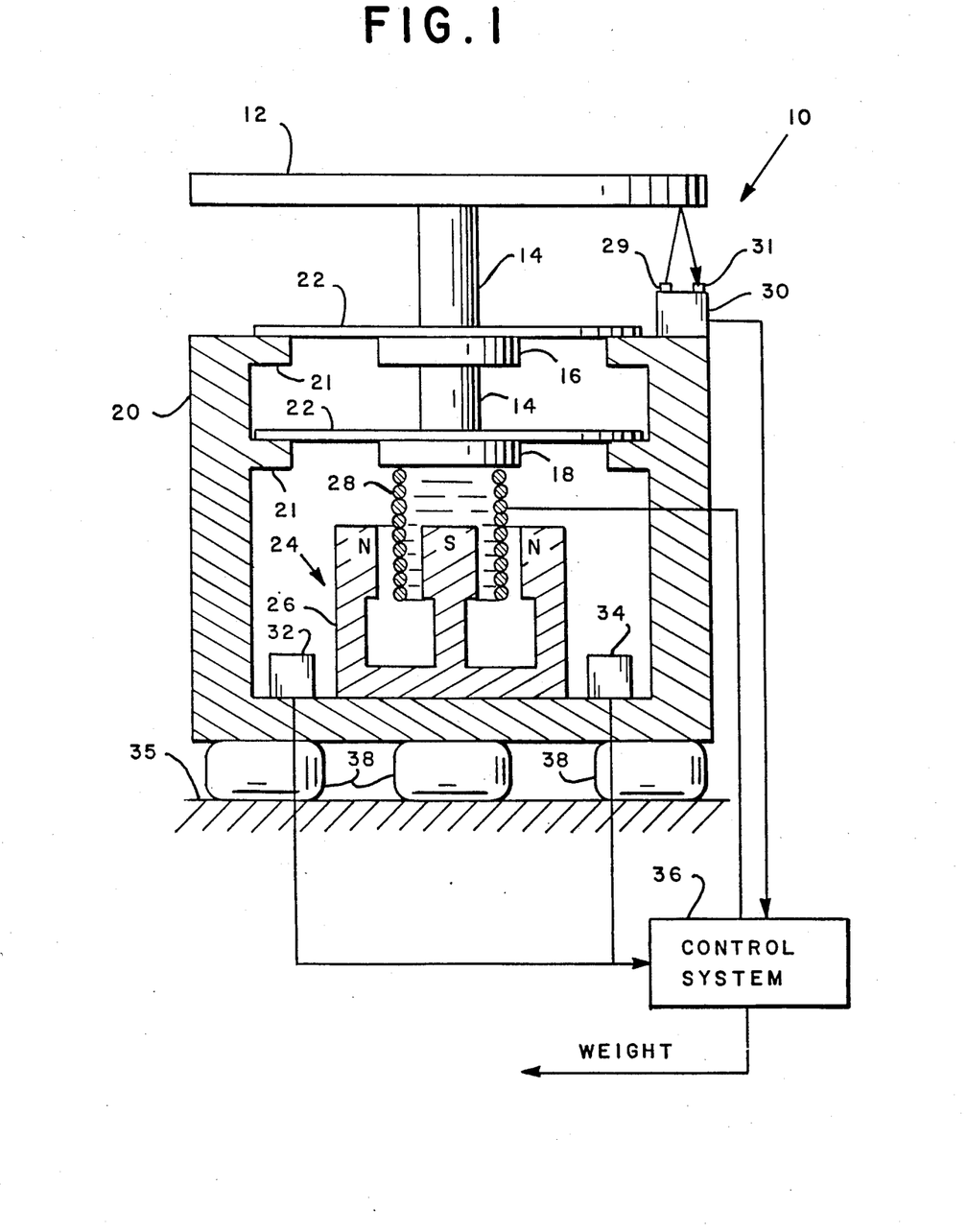
FIG. 1 shows a cross sectional view of a weighing scale that incorporates the features of the instant invention.

A weighing scale, of the force balance transducer type, that utilizes the instant invention is shown generally at 10 and includes a tray 12 upon which an article to be weighed can be placed. The tray 12 has a shaft 14 depending therefrom. Secured to the shaft 14 are an upper collar 16 and a lower collar 18 that may be secured to the shaft in any convenient fashion such as welding, bolting or being an integral part thereof. The shaft 14 is received within a housing 20 such that the tray 12 is positioned at a vertical location above the housing. The housing 20 has a pair of circular ribs 21 each of which supports an annular blade spring 22, which springs receive the shaft 14 within their central openings. The upper and lower collars 16, 18, respectively, of the shaft 14 are secured to the springs 22 in any convenient fashion such as welding, bolting and the like. Preferably, the springs are made of stainless steel and have a thickness of 10 to 30 mills, the preferable thickness being approximately 15 mills. Although this invention will be described with blade springs 22 that have an annular configuration, it will be appreciated that other forms of springs such as coil springs, individual leaf springs, and the like may be used in conjunction with the principles of the instant invention. Supported within the housing 20 is linear actuator in the form of a voice coil shown generally at 24, but other types of linear actuators can be used such as inductive linear motors, comparative type actuators and the like. The voice coil 24 includes a permanent magnet 26 that has a right cylindrical north pole and a central column defining a south pole as indicated in FIG. 1, and a conductive coil 28 that is disposed partially within arms of the permanent magnet 26. The conductive coil 28 is also secured to the lower collar 18 by any appropriate means such as welding.

Supported at the upper end of the housing 20 is a position sensor 30 that is capable of determining the vertical position of the tray. It is advantageous to locate the position sensor 30 at or near the center of gravity of the scale 10 to minimize sensitivity of the sensor to vibration, but for purpose of illustration and clarity, the sensor is located as shown in FIG. 1. The position sensor 30 may be any of a number of commercially available devices such as a laser sensor that has a laser beam source 29 and a photosensor 31. The laser beam is directed to the underside of the tray so as to emit a beam of light that is reflected to the photosensor whereby the position of the tray can be determined. A vibration sensor 32 is located on the floor of the housing 20 as is a temperature sensor 34. Preferably, the vibration sensor 32 should be located at or near the center of gravity of the scale 10 and the temperature sensor 32 in proximity to the springs 22 and coil 28, but, as before, for illustration purposes they are shown in their respective positions as seen in FIG. 1. The vibration sensor 32 determines the amount of vibration experienced by the scale 10 as a result of external vibrational forces that act upon a base 35 upon which the scale is supported and any other sources of vibration. The base 35 may be a table, mailing machine or any other structure that processes the objects to be weighed by the scale 10. The position sensor 30, vibration sensor 32 and temperature sensor 34 are all in electrical communication with a control system 36 by appropriate connections. The scale 10 is isolated from the base 35 by isolators 38 that are located therebetween. The isolators may be one of any conventionally known scale isolators such as springs, foam rubber or putty like material such as Ear Isodamp, a vibration isolation/damping material available from EAR Corporation, Indianapolis, Indiana.

Figure 2:
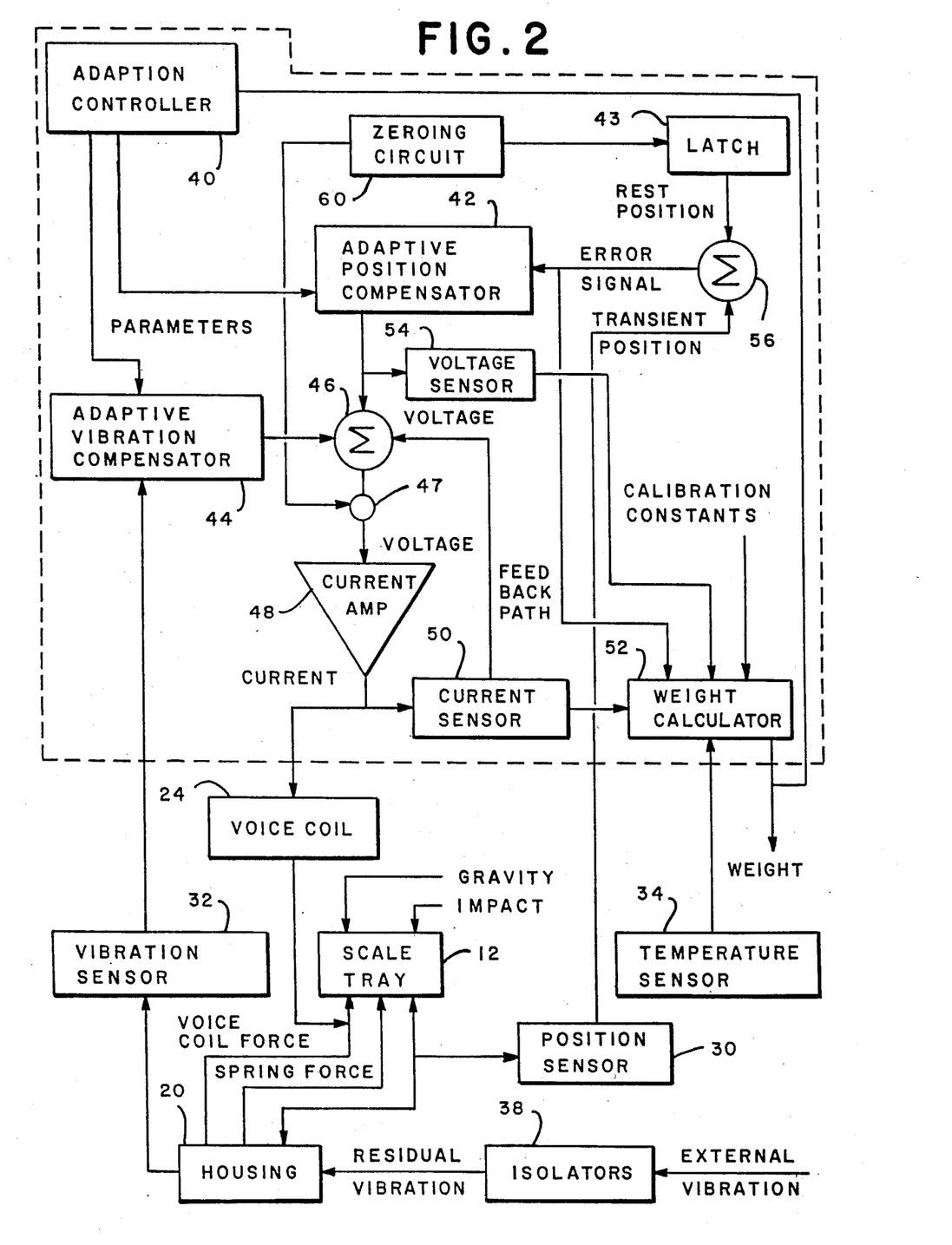
FIG. 2 shows in block diagram form the various components of the weighing scale and control system therefor.

Referring now to FIG. 2, the components of the control system 36 are shown in block diagram from along with the components of the scale to which they are connected. A digital signal processor 40, such as a Texas Instruments Model TMS 32010, with appropriate A/D and D/A convertors, ROMs and RAMs, has resident therein an adaption control algorithm that provides the overall control for the weighting operation. Although this type of digital signal processor is preferred, other devices such as microprocessors a bit slice controllers can be used also. The digital signal processor is preferred because it is fast and accurate while being easy to program. This digital signal processor 40 is in electrical communication with another digital signal processor 42 that has a position compensation algorithm programmed therein to function as an adaptive position compensator. The term adaptive as used in this specification means that the device or component described as adaptive is of a nature such that the parameters of its operation can be altered as required. The processor 40 communicates therein with still another digital signal processor 44 that has a vibration compensation algorithm programmed therein to serve as an adaptive vibration compensator. Both the adaptive position compensator 42 and adaptive vibration compensator 44 are in electrical communication with a summing junction 46. The summing junction 46 not only receives the outputs of the two processors 42,44, but is also in electrical communication with an amplifier 48 which in turn is in electrical communication, through a switch 47, with a current sensor 50 and the voice coil 28. The current sensor 50 is in electrical communication with a weight calculator 52, which again can be a digital signal processor, that contains a current/weight conversion algorithm. The weight calculator 52 receives an input from the temperature sensor 34 and another input from a voltage sensor 54 that is in electrical communication with the adaptive position compensator 42. Various calibration constants are also supplied to the weight calculator 52 including the amount of force produced in the voice coil 24, the current supplied to the coil 28 and the temperature of and amount of voltage applied to the voice coil.

Figure 4:
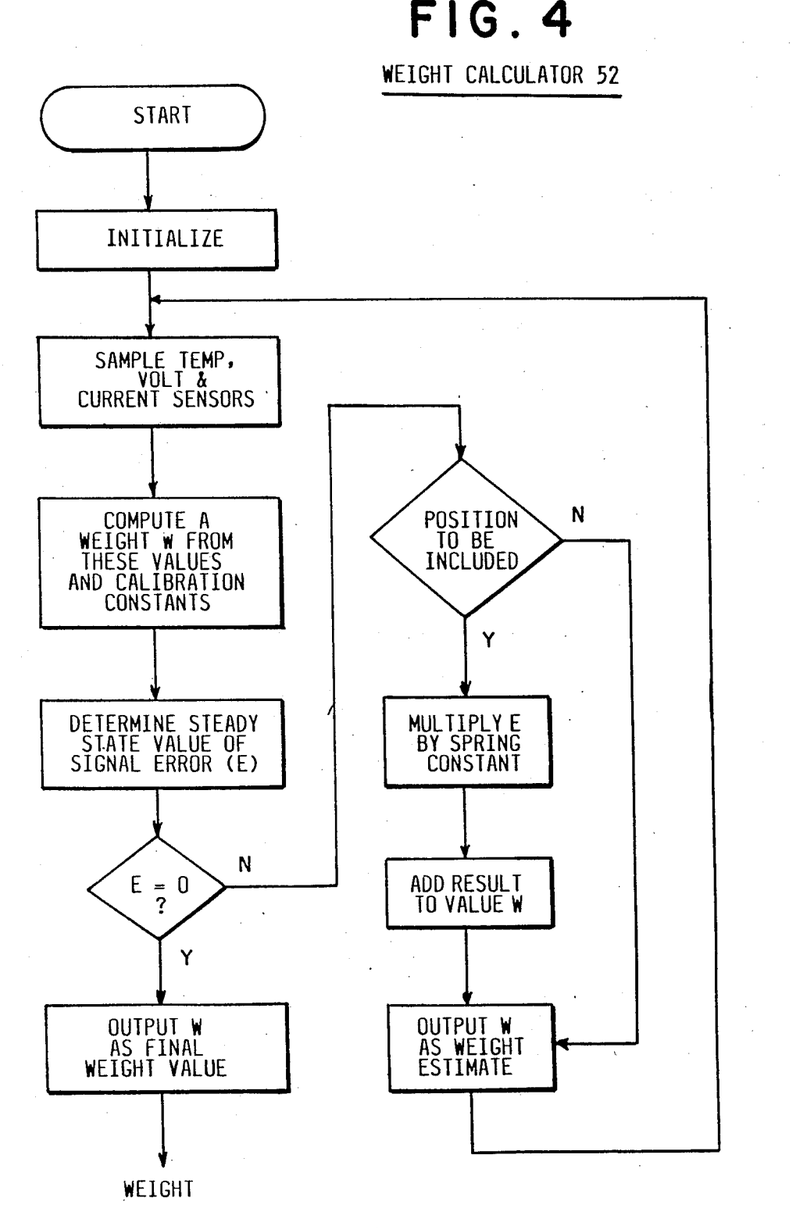
FIG. 4 is a flow chart which illustrates the program for the weight calculator shown in FIG. 2.

The position sensor 30 communicates with a summing junction 56 and a latch 58 which in turn is in communication with the summing junction 56. The summing junction 56 outputs an error signal to the adaptive position compensator 42 and the weight calculator 52. Based upon the inputs from the current sensor 50, the voltage sensor 54, the temperature sensor 34, the calibration constants, and the error signal, the weight calculator 52 determines the weight and outputs the weight determination either in the form of an electrical signal or in the form of a display. The program for the weight calculator is described in FIG. 4.

Figure 5:
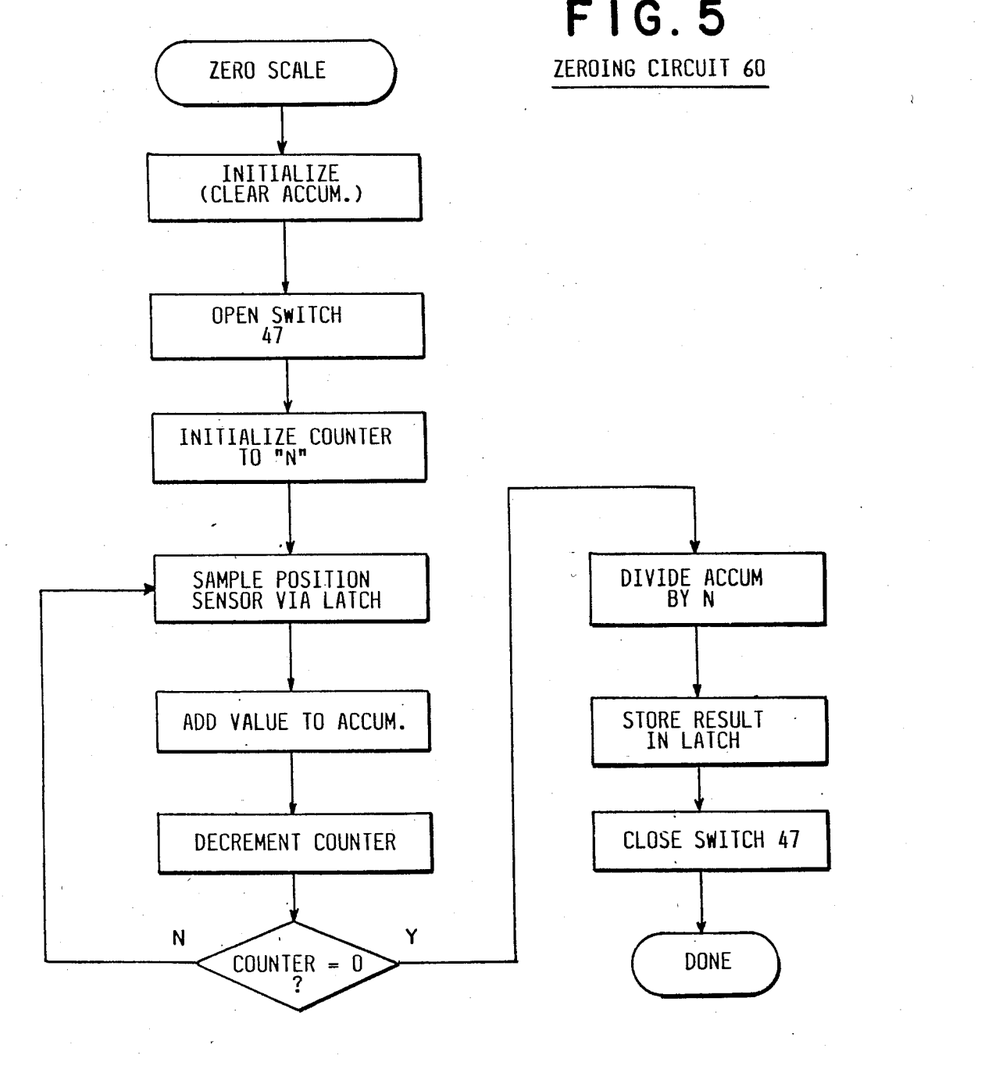
FIG. 5 is a flow chart which illustrates the program for the zeroing circuit shown in FIG. 2.

A zeroing circuit 60 is in communication with the switch 47 and the latch 58 to allow calibration of the tray 12 rest position as required. This can be accomplished manually, or automatically by any of a variety of conventional devices, by an operator actuating the zeroing circuit with no article, or weight, on the tray 12. The zeroing circuit 60 could be a microprocessor such as an Intel Model 8031. The program for the zeroing circuit 60 is described in FIG. 5. By opening the switch 47, the adaptive position compensator 42 and the adaptive vibration compensator 44 would be disabled preventing current from flowing through the voice coil 24. In this state, the springs are the only force supporting the tray 12 and as a result the tray will stabilize at a position that is hereinafter referred to as its rest position. After the tray 12 has stabilized, the output of the position sensor 30 is gated into the latch 43 to be stored. It will be appreciated that several samples of the tray 12 position should be taken and mathematically combined to remove the effects of external forces such as vibration, current amplifier offsets, electrical noise and the like. After the rest position is determined, the zeroing circuit is disabled, the switch 47 is closed and the adaptive position compensator 42 and adaptive vibration compensator activated.

In operation, an article to be weighed is placed upon the tray 12. Although the tray 12 is shown as being adapted to receive an article placed thereon manually, it will be appreciated that conveying mechanisms may be attached to the tray for the purpose of conveying articles and holding them during weighting. Such conveying mechanisms are shown and described in said copending application Ser. No. 073,790. The weighting principles for static weighting, i.e., manually placing an article on the tray 12, and dynamic weighting, i.e., using article conveying mechanisms to individually place articles on the tray, would be the same; consequently, for purposes of clarity the scale 10 is shown without such attendant conveying mechanisms.

Figure 6:
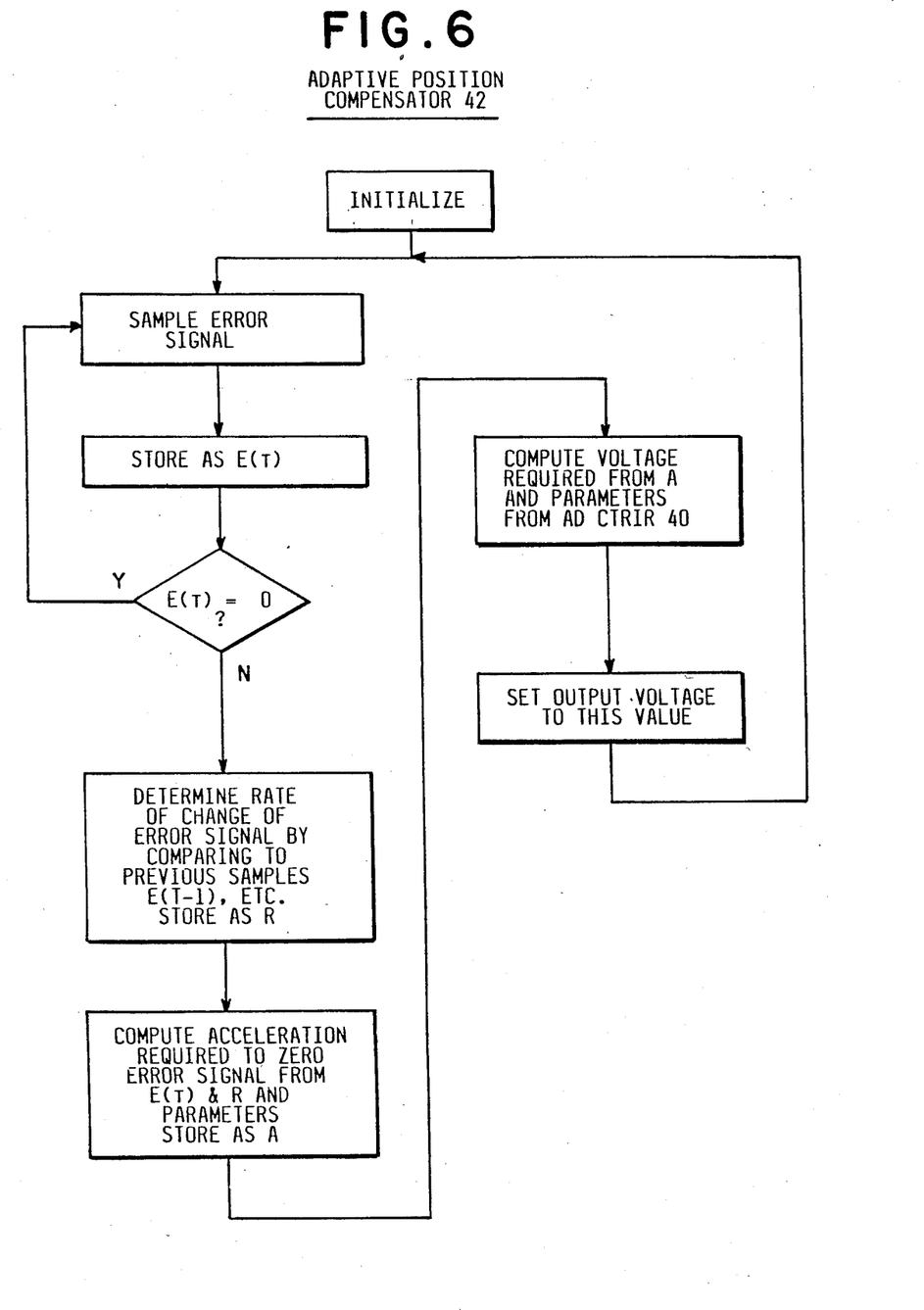
FIG. 6 is a flow chart which illustrates the program for the adaptive position compensator shown in FIG. 2.

As an article is placed upon the tray 12, the tray would be displaced downwardly in proportion to the weight of the article which acts upon the springs 22. The position sensor 30 will indicate that the tray 12 is no longer in its original or rest position by communicating information to the summing junction 56. The summing junction 56 will generate an error signal which represents the difference between the transient position of the tray and the rest position stored in the latch 43. This error signal will be communicated to the adaptive position compensator 42 which can then determine the velocity of the tray 12. The adaptive position compensator 42 will cause a voltage through the summing junction 46 that is converted to current by the amplifier 48 to be passed through the conductive coil 28. This current is proportional to the error signal such that the field acting upon the coil 28 will cause the coil to be magnetically levitated with respect to the permanent magnet 26 thereby lifting the tray 12 vertically towards its rest position. The program for the adaptive position compensator 42 is described in FIG. 6. As with any scale, after the article is placed on the tray, a period is required before the tray will reach equilibrium. In most scales this is a result of the reactive force of the springs but with the instant scale 10 it is the effect of the current biasing the tray upwardly, as well as the effect of the springs 22. In order to increase the rate of decay of the oscillations as the tray is returned to its original position, the current will be adaptively controlled in proportion to the error signal. When the tray has returned to its rest position, the error signal has a value of zero. After the weight calculator 52 senses that the steady state value of the error signal has returned to a zero value, the weight of the article can be determined based upon the current in the coil 28, as indicated by the current sensor 50, the voltage at the current amplifier 48, as sensed by the voltage sensor 54, the calibration constants and the temperature of the system, as sensed by the temperature sensor 34. The signal from the temperature sensor 34 can be used to dynamically adjust the parameters of the weight calculator 52 as required such that the relationship between current and mass, or voltage and mass or both current and voltage in combination with the mass remain accurate.

Figure 3:
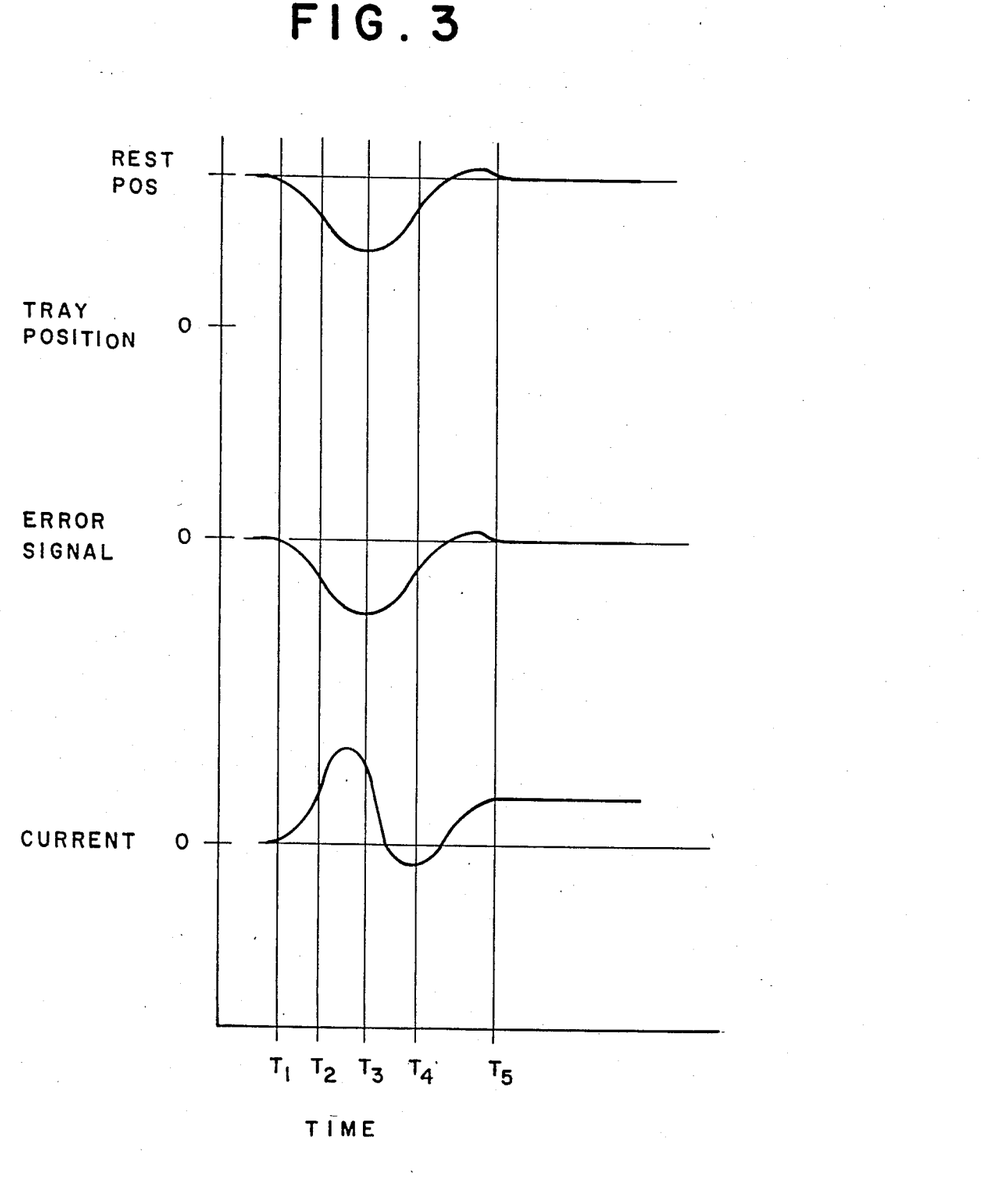
FIG. 3 shows a plot describing the control of current to the voice unit relative to the position of the tray shown in FIG. 1.

The above weighing operation is illustrated by the three plots shown in FIG. 3. The upper plot shows the position of the tray 12. At time t, an article is placed upon the tray 12 and tray begins to descend. The error signal, represented by the middle plot, mirrors the change in position of the tray. At time $t_2$, the adaptive position compensator 42 causes the current through the coil 28 to inverse as the tray 12 continues to fall. At time $t_3$ the downward motion of the tray 12 has been arrested due to the combined forces of the magnetic field generates by the voice coil 24 and the effects of the springs 22. At time $t_4$, the tray 12 is rising toward its rest position. The adaptive position controller 42 has reduced the amount of current through the coil 28 to prevent the tray 12 from acquiring excessive upward momentum, thus reducing its tendency of overshooting its rest position. At time $t_5$, the tray 12 has stabilized at its rest position, the steady state value of the error signal has returned to zero and the amount of current to the coil 28 has stabilized to a value sufficient to support the article on the tray. As stated previously, the current values are a factor in determining the weight of the article. Between time t, and $t_5$, the current applied is not only proportional to the position of the tray 12, but is also responsive to the velocity of the tray. Thus, between $t_2$ and $t_3$ the increase in current is greater than the displacement of the tray but between $t_3$ and $t_5$ it is less than such displacement. With this response to the velocity of the tray 12, as well as its displacement, faster stabilization of the tray at its rest position is achieved.

Figure 7:
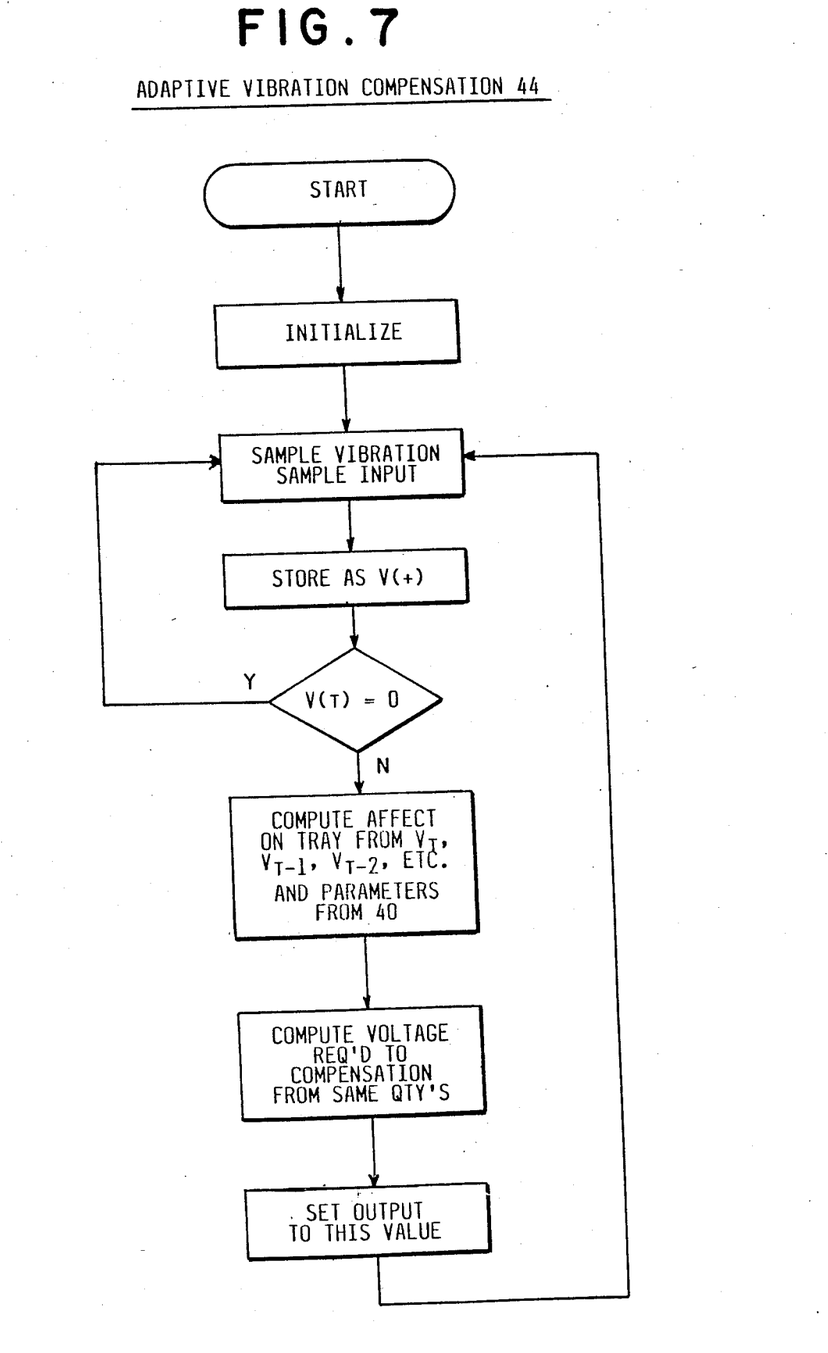
FIG. 7 is a flow chart which illustrates the program for the adaptive vibration compensator shown in FIG. 2.

While the position adjusting process through application of current is taking place, the vibration sensor 32 will sense the vibrations within the housing 20. The vibration sensor 32 will send a signal to the adaptive vibration compensator 44, and the latter will send a signal to the summing junction 46 to effect the amount of current applied to the coil 28 thereby minimizing the effects of vibration on the weight determination. The program for the adaptive vibration compensator 44 is described in FIG. 7.

The advantages of the scale 10 described is that fast accurate weighing may be achieved because of the adapting of parameters within the system to the weight applied and also which takes into the account the effects of external influences such as vibration and temperature. With such a scale, articles weighing up to 32 ounces could be weighed within ±1/32 of an ounce. The time required to return the tray 12 to its original position after an article has been placed thereon and weigh such an article is approximately 1/10 of a second.

In an alternate method by which the scale 10 is capable of determining the weight of an article placed on the tray 12, the rest position of the tray is sampled before the article is placed upon the tray. When the article is applied, the tray 12 travels downward, due to the weight of the article, plus any impact force. The control system 36 applies sufficient force via the voice coil 24 to stop the motion of the tray 36, without necessarily returning it to the rest position. When the tray 12 is stabilized, i.e. zero velocity, the weight of article can be calculated from the current applied through the coil 28, as described before the difference between the original rest position and the new rest position, and the known value of the deflecting constant of the springs 22.

Because of the variance in spring constants due to manufacturing tolerances and aging, this alternative embodiment may be less accurate than the embodiment described previously, but it would be faster.

The vibration sensor 32 measures vibration induced into the scale 10 by its environment. The adaptive vibration compensator 44 takes the output of the vibration sensor 32 and, based on that signal, inputs into the voice coil 28, through the summing junction 46 and amplifier 48, sufficient current to prevent the displacement of the tray relative to the scale base from changing due to the force of the vibration. In effect, if a shock would normally cause the base to move up slightly, additional current is added to the voice coil 28 to cause the tray to rise as well, tending to keep the distance between the tray and the position sensor 30 constant.

This system is somewhat unique, in that the compensators 42,44 are adaptive to the weight applied. For example, in the adaptive vibration compensator 44, if it is sensed that the housing is going to be displaced by vibration, an equal displacement is required of the tray and the amount of force required, and hence the current through the coil 28, is proportional to the mass of the tray 12 plus that of the article being weighed. Failure to adapt to the differences range of weights.

Figure 8:
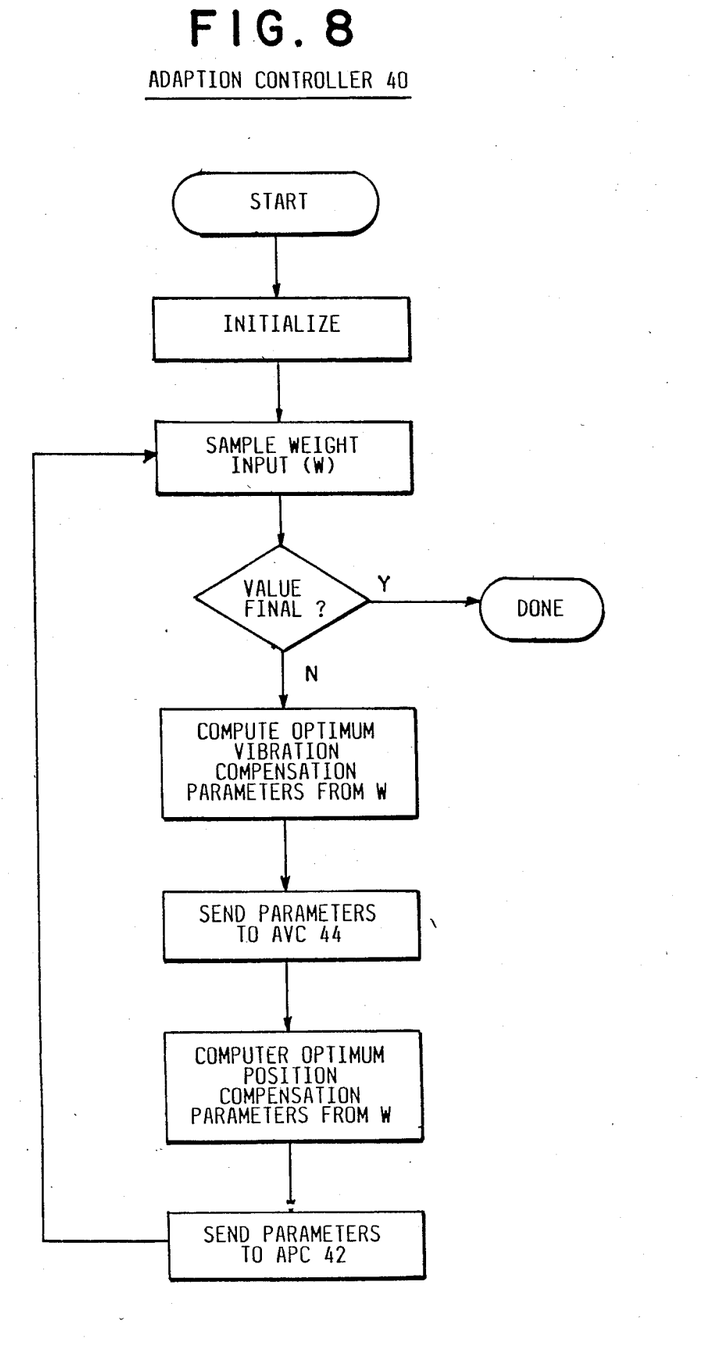
FIG. 8 is a flow chart which illustrates the program for the adoption controller shown in FIG. 2.

In this invention, however, interim weight calculations are fed back to the adaption controller 40, which adjusts parameters such as gain, frequency, response and period of integration within the two compensators 42,44 to best match the weight applied, as described in FIG. 8. Initially, the weight estimate will be crude, but over time, as appropriate compensation is applied, the system will stabilize, and the accuracy of the weight measurement will increase. With the increase in accuracy of the weight determination, the parameters of the compensators 42,44 can be more accurately tuned, and thus the system rapidly converges to a stable point.

Additionally, the output of the position sensor, plus knowledge of the spring constant of the springs 22 used to suspend the tray 12 could be supplied to the weight calculator 52 to improve early weight estimates.

What is claimed is:

1. A weighing scale of the force balance transducer type for weighing articles, the combination comprising:
   a housing,
   a tray,
   support means secured to said tray and received within said housing,
   at least one spring attached at one location to said support means and at another location to said housing, wherein said tray is operative to move vertically,
   said tray having a rest position when supported solely by said at least one spring without any article on said tray,
   sensing means for sensing the position and velocity of movement of said tray in response to an article being placed upon said tray,
   a voice coil attached to said support means and to said housing, means for providing a current to said voice coil in response to said location sensor sensing when said tray is moved downwardly from said rest position and to return said tray to its rest position after an article to be weighed has been placed on said tray, means for measuring the current in said voice coil, means for controlling the current to said voice coil in response to the position and velocity of said tray so as to expedite the return of said tray to its rest position, and means for determining the weight of an article on said tray in response to the measured current required to hold said tray at its rest position after an article has been placed thereon.

2. The weighing scale of claim 1 wherein said weight determining means includes means for estimating the weight of said article before said tray has reached equilibrium at said rest position.

3. The weighing scale of claim 2 wherein said weight estimating means includes means for receiving transient current values from said current measuring means and factoring said transient current values into calculations for said weight estimating.

4. The weighing scale of claim 2 wherein said weight estimating means includes means for receiving transient tray position values from said position and velocity sensing means, and means for supplying said transient tray position values to said weight determining means whereby said transient tray position values can be factored into the estimating of the weight of an article on said tray.

5. The weighting sale of claim 2 including a voltage sensor in communication with said voice coil and weight determining means and wherein said weight calculator means receive transient voltage values from said voltage sensor and factors said transient voltage values into said weight estimating determination.

6. A weighting scale of the force balance transducer type for weighing articles, the combination comprising:

a housing, tray having a rest position, a shaft secured to the tray and received within said housing, spring means attached at one location to said shaft and at another location to said housing, whereby said tray is operative to move vertically, means for determining the position and velocity of movement of said tray, said rest position being the position assumed by said tray when supported by said spring means without an article thereon, a voice coil attached to said shaft and to said housing, means for providing a current to said voice coil, adaptive position compensator means in communication with said and velocity determining means and with said current providing means for controlling the amount of current supplied by said current providing means in response to the position and velocity of said tray, means for measuring the current provided to said voice coil, and means for determining the weight of an article upon said tray based upon the current supplied to said voice coil, whereby upon an article being placed upon said tray, said tray will deviate from said rest position whereupon the amount and velocity of said deviation will be monitored by said position and velocity determining means, said current providing means in response to said position and velocity determining means will provide sufficient current to said voice coil to restore said tray to said rest position and said weight determining means determines the weight of the article on said tray in response to the amount of current required to maintain said tray in said rest position after an article has been placed thereon.

7. The weighing scale of claim 6 including latch means in communication with said tray position and velocity determining means, said latch means being operative to store tray position values when said tray is positioned in said rest position, said latch means being in communication with said adaptive position compensator to supply a rest position value thereto.

8. The weighing scale of claim 7 including means for disabling said current supply means and zeroing means in communication with said disabling means and with said latch means whereby said zeroing means is operative to activate said disabling means thereby causing no current to be provided to said voice coil and said tray is supported only by said spring means, said position and velocity determining means being operative to send a position value to said latch means and said zeroing circuit causes said position value to be latched in said latch means to thereby define a rest position value.

9. The weighing scale of claim 8 including an adaption controller in communication with said adaptive position controller and said weight determining means whereby transient weight estimates are supplied to said adaption controller by sand weight determining means and said adaption controller alters the parameters of said adaptive position controller in response to said weight estimates.

* * * * *